J. H. TRACY.
SYSTEM OF ELECTRICAL DISTRIBUTION.
APPLICATION FILED MAR. 19, 1908.
902,777.
Patented Nov. 3, 1908.
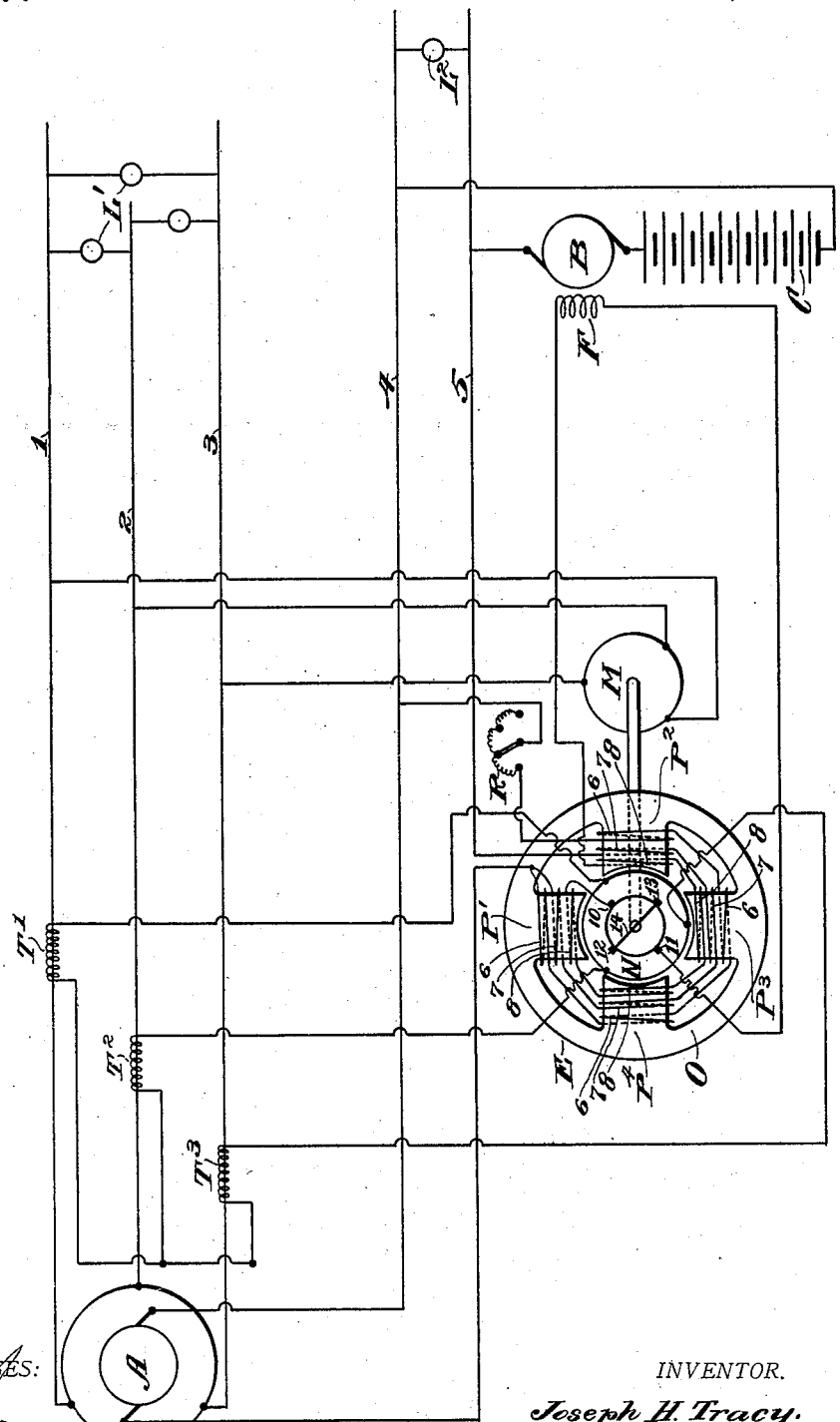
WITNESSES:
INVENTOR.
Joseph H. Tracy.
BY
Augustus D S Houghton
ATTORNEY.

UNITED STATES PATENT OFFICE.

JOSEPH H. TRACY, OF PHILADELPHIA, PENNSYLVANIA.

SYSTEM OF ELECTRICAL DISTRIBUTION.

No. 902,777.  Specification of Letters Patent.  Patented Nov. 3, 1908.

Application filed March 19, 1908. Serial No. 422,133.

*To all whom it may concern:*

Be it known that I, JOSEPH H. TRACY, a citizen of the United States, and a resident of Philadelphia, in the county of Philadelphia and State of Pennsylvania, have invented a certain new and useful System of Electrical Distribution, of which the following is a specification.

My invention relates to systems of distribution in which both alternating and direct current translating devices are supplied from a common source, and in which a storage battery is installed to compensate for the fluctuations of load on both the alternating and direct current circuits.

In general my invention provides apparatus for controlling the operation of the battery in response to variations in the combined output of the source to both circuits. This and other objects as well as the general nature of the invention will be more clearly seen by reference to the following description in connection with the accompanying drawing, in which A is a source of direct and alternating currents, for example, a double current generator provided with alternating current taps and a commutator connected to the same winding. The source A may be driven by any suitable prime mover, and as here shown is connected to the alternating current circuit 1, 2, and 3, and to the direct current circuit 4 and 5, to which circuits are connected respectively the translating devices $L^1$ and $L^2$ constituting fluctuating loads. A storage battery C with its booster B is connected across the direct current circuit. The field F of the booster is energized by the exciter E in such a way as to cause the battery to charge and discharge in response to variations of the total combined load on the source A.

The exciter E consists of an armature N revolving in a field frame O, which latter is provided with four polar projections $P^1$, $P^2$, $P^3$, and $P^4$. This armature is provided with a bi-polar winding and a commutator upon which bear two pair of brushes 10—11 and 12—13. The brushes 12—13 are shortcircuited by a conductor 14 of low resistance, while the brushes 10—11 are connected to the field F of the booster. The poles of the machine E are provided with three field windings. One of these 7, is connected in series with conductor 5 between the source A and the junction of the battery branch so as to carry a current proportional to the direct current output of the source. Winding 6, is connected in shunt across the circuit 4, 5, and may be controlled by the rheostat R. The third winding 8, is connected in series between brush 10 and the field F. The armature winding of the exciter E, is also connected to the secondary windings of the current transformers $T^1$, $T^2$ and $T^3$, whose primaries are connected in series with conductors 1, 2, and 3, respectively. By this means alternating current proportional to the alternating current output of the source A is transmitted through the armature winding of the machine E. A synchronous motor M, driven by current from the alternating circuit 1, 2, 3, is shown connected to the armature shaft of the machine E.

The operation of this apparatus is then as follows: The current transmitted through the armature winding of the machine E from the current transformers $T^1$, $T^2$, $T^3$, would produce a rotating field were it not for the fact that the rotation produced by the motor M, which is in the opposite direction to that of the field, will hold this field stationary in space. The connections are such that the effect of this alternating current in the armature winding will produce a field of like polarity, as for example north polarity, in the poles $P^1$, $P^2$, and of the opposite polarity in the poles $P^3$ and $P^4$. The series winding 7, that carries the direct current output from the source A is designed to produce a similar field in the poles of the exciter E. The number of turns of this latter field is such that a given output in kilowatts from the source A to the direct current circuit 4—5 will produce the same field strength, as the same output in kilowatts in the alternating current circuit 1, 2, 3 will produce by reason of the alternating current transmitted through the armature winding. Thus, so long as the total output from the machine to the two circuits remains constant, the field strength produced by the combined action of the field winding 7 and of the alternating current in the armature winding will be constant. The field winding 6, is excited differentially with respect to winding 7, and by means of the rheostat R, its strength may be so adjusted as to exactly neutralize the field which would otherwise be produced with some predetermined combined load on the source A, so that the field strength will be zero when the total load on the source A is equal to this predetermined value. Under these conditions the voltage between the brushes 12 and 13 will be zero and no current will flow between these brushes through the conductor 14. Any increase in the total output from the source A, whether to the alternating current or to the direct current circuit will cause the combined excitation due to the alternating current in the armature and the direct current in field winding 7 to predominate over that of the shunt field winding 6, thus producing a field whose axis is in a line joining brushes 10 and 11, and this field will produce a voltage between the brushes 12 and 13. A very small change in the total load on the source A producing a very small voltage between the brushes 12 and 13, will cause a flow of current between the latter brush of considerable magnitude on account of the low resistance of conductor 14, and this current flowing through the armature winding will produce a second field of considerable magnitude, whose axis will be in the line joining the brushes 12 and 13, and this field will produce a voltage of considerable magnitude across the brushes 10 and 11, which will send current through the field F of the booster to cause the battery to discharge. Similarly a small decrease in the output from the source A will cause the excitation of the shunt field 6, to predominate producing a net field and flow of current between brushes 12 and 13 in the opposite direction and a reversal of the booster voltage, causing the battery to charge. The field winding 8, which is in series between brush 10 and the field winding F, serves to neutralize the armature re-action due to a flow of current in the armature winding between brushes 10 and 11, preventing this flow of current from having any appreciable effect on the voltage.

It will be obvious to those skilled in the art that modifications may be made in details without departing from the spirit of the invention, hence I do not limit the invention further than the prior state of the art may require, but having thus described the nature and object of my invention

What I claim as new and desire to secure by Letters Patent is:

1. In combination an alternating current circuit, a direct current circuit, a source of electrical energy connected to both circuits, a storage battery operatively arranged in respect to the source, a field structure and in inductive relation thereto an armature provided with a winding, commutator and brushes, means for transmitting through the armature winding alternating currents proportional to the alternating current output from the source, means for producing a field excitation proportional to the direct current output from the source, and connections from the brushes for controlling the charge and discharge of the battery responsively to changes in the combined alternating current and direct current excitation.

2. In combination an alternating current circuit, a direct current circuit, a source of electrical energy connected to both circuits, a storage battery operatively arranged with respect to the direct current circuit, a field structure with appropriate field windings and in inductive relation thereto an armature provided with a winding and a commutator, means for transmitting through the armature winding and the field windings currents proportional respectively to the alternating current and the direct current output from the source to produce a resultant field, a set of electrically interconnected brushes bearing on the commutator and appertaining to said resultant field and adapted to permit a flow of current through the armature winding to produce a second field displaced from the first and responsive thereto, a second set of brushes appertaining to the second field, and connections from the second set of brushes for controlling the operation of the battery.

3. In combination an alternating current circuit, a direct current circuit, a source of electrical energy connected to both circuits, a storage battery operatively arranged with respect to the direct current circuit, a field structure with appropriate field windings and in inductive relation thereto an armature provided with a winding and a commutator, means for transmitting through the armature winding and the field windings currents proportional respectively to the alternating current and the direct current output from the source to produce a resultant field, a set of electrically interconnected brushes bearing on the commutator and appertaining to said resultant field, and adapted to permit a flow of current through the armature winding to produce a second field displaced from the first and responsive thereto, a second set of brushes appertaining to the second field, connections from the second set of brushes for controlling the operation of the battery, and means for producing relative rotation of armature and field in synchronism with the source.

4. In combination an alternating current circuit, a direct current circuit, a source of electrical energy connected to both circuits, a storage battery and booster operatively arranged with respect to the direct current circuit, a field structure with appropriate field windings and in inductive relation thereto an armature provided with a winding and a commutator, means for transmitting through the armature winding and the field windings currents proportional respectively to the alternating current and the direct current output from the source to produce a resultant field, a set of electrically interconnected brushes bearing on the commutator and appertaining to said resultant field, and adapted to permit a flow of current through the armature winding to produce a second field displaced from the first and responsive thereto, a second set of brushes appertaining to the second field, and connections from the second set of brushes for controlling the operation of the booster.

5. In combination an alternating current circuit, a direct current circuit, a source of electrical energy connected to both circuits, a storage battery and booster operatively arranged with respect to the direct current circuit, a field structure with appropriate field windings and in inductive relation thereto an armature provided with a winding and a commutator, means for transmitting through the armature winding and the field windings currents proportional respectively to the alternating current and direct current output from the source to produce a resultant field, a set of electrically interconnected brushes bearing on the commutator and appertaining to said resultant field and adapted to permit a flow of current through the armature winding to produce a second field displaced from the first and responsive thereto, a second set of brushes appertaining to the second field, and connections from the second set of brushes for controlling the operation of the booster, and means for producing relative rotation of armature and field in synchronism with the source.

In testimony whereof I have hereunto signed my name.

JOSEPH H. TRACY.

Witnesses:
J. W. ACHARD,
CARROLL HODGE.